UNITED STATES PATENT OFFICE.

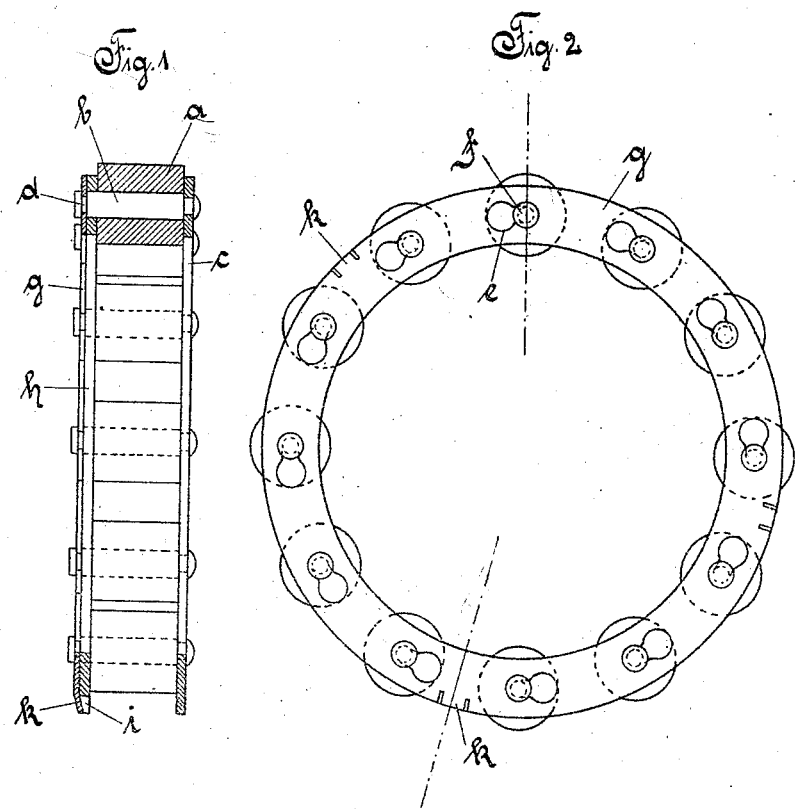

ALBERT HIRTH, OF CANNSTATT, GERMANY, ASSIGNOR TO NORMA COMPAGNIE G. M. B. H., OF CANNSTATT-STUTTGART, GERMANY.

ROLLER-BEARING CAGE.

1,026,584.      Specification of Letters Patent.     Patented May 14, 1912.

Application filed April 11, 1911. Serial No. 620,389.

*To all whom it may concern:*

Be it known that I, ALBERT HIRTH, subject of the Emperor of Germany, residing at Cannstatt, in the Empire of Germany, have invented certain new and useful Improvements in Roller-Bearing Cages, of which the following is a specification.

This invention has for its object a cage for roller bearings, in which the rollers are mounted on pins or bolts.

The essential feature of the invention consists in one end of the roller bolts being fixed in a cage ring, while two rings provided with perforations for the passage of the ends of the bolts are placed on the free ends of the bolts, one of which rings lies flush on the bolt ends, while the other by being turned is brought into engagement with grooves in the ends of the bolts and thereby closes the cage.

One form of construction of the cage is shown as an example in the accompanying drawings:—Figure 1 being a vertical section; Fig. 2, a front view; and Fig. 3, a detail of an amended form of construction of the cage.

The pins $b$ carrying the rollers $a$ are beveled at one end and fixed in the case ring $c$. At their free end they are provided with a groove $d$ with which a ring $g$ provided with perforations $e$ and a contraction $f$ connecting therewith, engages when the ring is turned into the position shown after the free ends of the pins have been passed through the perforations $e$. A second ring $h$ fits flush on the bolt ends and thus assists to hold together the cage itself. This ring $h$ may also be employed for securing the ring $g$ against being turned back. For this object, in the form of construction shown, the ring $h$ is provided with recesses $i$ in which tongues $k$ on the first ring $g$ rest after the latter has been turned.

Instead of the roller pins being all fixed in a cage ring $c$, they may also be partly fixed in the opposite ring, each ring then serving simultaneously for fastening the free ends of the pins fixed in the other ring. The stiffening of the cage by the ring $h$ placed flush on the free ends of the pins may also be done more advantageously if the ends of the pins are tapered conically as shown in Fig. 3 and the ring provided with corresponding tapering perforations.

I declare that what I claim is:—

1. A roller bearing cage comprising in combination a ring, bolts attached to the said ring, rollers mounted on these bolts, a second ring fitting flush onto the free ends of the said bolts, and a third ring adapted to be brought into engagement by turning with grooves in the ends of the bolts in order to prevent the second ring slipping off the ends of the bolts.

2. A roller bearing cage comprising in combination a ring, bolts attached to the said ring, rollers mounted on these bolts, a second ring fitting flush onto the free ends of the said bolts, a third ring adapted to be brought into engagement by turning with grooves in the ends of the bolts, and tongues on the said third ring engaging in recesses in the second ring when the locking ring is in position in order to prevent the second ring slipping off the ends of the bolts.

3. A roller bearing cage comprising in combination a ring, bolts attached to the said ring, rollers mounted on these bolts, a second ring provided with holes through which the ends of the bolts project, a third ring provided with apertures through one end of which the ends of the bolts can be passed, the sides of the other end of the apertures being adapted to engage in a groove in the end of the bolt when the third ring is turned and thus lock the rings in position.

In witness whereof, I have hereunto signed my name this 15th day of March 1911, in the presence of two subscribing witnesses.

ALBERT HIRTH.

Witnesses:
ERNEST ENTENMANN,
ECH. JUNGHAUS.